US012177952B2

(12) United States Patent
Leizerovich

(10) Patent No.: US 12,177,952 B2
(45) Date of Patent: Dec. 24, 2024

(54) APPARATUS AND METHOD FOR SELECTIVELY COUPLING A DALI-COMPATIBLE CONTROLLER AND/OR A DALI-COMPATIBLE POWER SUPPLY TO A DALI NETWORK BUS THROUGH A POWERLINE INTERFACE OF A SMART CONTROL DEVICE

(71) Applicant: UBICQUIA LLC, Fort Lauderdale, FL (US)

(72) Inventor: Gustavo Dario Leizerovich, Aventura, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 0 days.

(21) Appl. No.: 17/216,600

(22) Filed: Mar. 29, 2021

(65) Prior Publication Data

US 2021/0307148 A1   Sep. 30, 2021

Related U.S. Application Data

(60) Provisional application No. 63/001,840, filed on Mar. 30, 2020.

(51) Int. Cl.
*H05B 47/185* (2020.01)
(52) U.S. Cl.
CPC .................... *H05B 47/185* (2020.01)
(58) Field of Classification Search
CPC .................................................. H05B 47/185
See application file for complete search history.

(56) References Cited

U.S. PATENT DOCUMENTS 9,686,842 B1   5/2017   Coombes et al.
9,888,542 B1 * 2/2018   Wagner .................. H05B 47/16
(Continued)

FOREIGN PATENT DOCUMENTS

EP           3171675 A1    5/2017
KR    10-2012-0095153 A    8/2021
WO        2019136480 A2    7/2019

OTHER PUBLICATIONS

Korean Intellectual Property Office, International Search Report issued in connection with counterpart International Application No. PCT/US2021/024759, Jul. 20, 2021, 3 pages.
(Continued)

*Primary Examiner* — Minh D A
(74) *Attorney, Agent, or Firm* — Daniel C. Crilly

(57) ABSTRACT

A smart control device includes a processor, a memory, a powerline interface, a power supply compatible with a Digital Addressable Lighting Interface (DALI) protocol, a first controller, a second controller, and configuration circuitry. The powerline interface has a set of primary contacts (Line, Load, and Neutral) and a set of secondary contacts. The set of secondary contacts includes a first pair of secondary contacts and a second pair of secondary contacts. The configuration circuitry is arranged to selectively couple (a) an output of the first controller to the first pair of secondary contacts (e.g., when there is no output from the second controller) or (b) an output of the second controller to the first pair of secondary contacts and an output (or outputs) of one or more of the first controller and the power supply to the second pair of secondary contacts.

20 Claims, 6 Drawing Sheets

(56) References Cited

U.S. PATENT DOCUMENTS

| | | | |
|---|---|---|---|
| 10,153,916 | B1 | 12/2018 | Kostrun |
| 2012/0212140 | A1 | 8/2012 | Kim et al. |
| 2013/0119894 | A1 | 5/2013 | Yeh et al. |
| 2013/0147351 | A1 | 6/2013 | Trainor et al. |
| 2013/0264971 | A1 | 10/2013 | Yeh et al. |
| 2016/0270179 | A1* | 9/2016 | Ryhorchuk .......... H04N 5/2256 |
| 2018/0249557 | A1* | 8/2018 | Pereira ................ H04L 12/4135 |
| 2018/0288860 | A1* | 10/2018 | Vendetti ................. H05B 47/19 |
| 2019/0261493 | A1* | 8/2019 | Dolan .................... H05B 45/10 |
| 2019/0389576 | A1* | 12/2019 | White, III ............... B64C 25/04 |
| 2020/0083883 | A1 | 3/2020 | Hutson et al. |
| 2020/0088390 | A1* | 3/2020 | Stegeman ............ H05B 47/115 |
| 2020/0096180 | A1* | 3/2020 | Stegeman ............... F21S 8/086 |

OTHER PUBLICATIONS

Korean Intellectual Property Office, Written Opinion of the International Searching Authority issued in connection with counterpart International Application No. PCT/US2021/024759, Jul. 20, 2021, 4 pages.

European Patent Office, Supplementary European Search Report issued in connection with counterpart European Application No. 21779942.8, Jul. 18, 2023, 12 pages.

TE Connectivity, "ANSI C136.41-2013 Dimming Receptacles," Application Specification 114-32115, Apr. 21, 2015, 6 pages.

Canadian Intellectual Property Office, Office Action issued in connection with counterpart Canadian Application No. 3,204,097, Feb. 28, 2024, 4 pages.

\* cited by examiner

APPARATUS AND METHOD FOR SELECTIVELY COUPLING A DALI-COMPATIBLE CONTROLLER AND/OR A DALI-COMPATIBLE POWER SUPPLY TO A DALI NETWORK BUS THROUGH A POWERLINE INTERFACE OF A SMART CONTROL DEVICE

CROSS-REFERENCE TO RELATED APPLICATIONS

The present application claims priority upon and the benefit of U.S. Provisional Application No. 63/001,840, which was filed on Mar. 30, 2020 and is incorporated herein by reference in its entirety.

TECHNICAL FIELD

The present disclosure relates generally to controllers and systems that utilize a Digital Addressable Lighting Interface (DALI) protocol and, more particularly, to a method and apparatus for selectively coupling a DALI-compatible controller and/or a DALI-compatible power supply to a DALI network bus through a powerline interface of a smart control device.

BACKGROUND

As an acronym for Digital Addressable Lighting Interface, "DALI" is a trademark owned by the IEEE Industry Standards and Technology Organization. In practice, one of skill in the art recognizes DALI, DALI, and D4I as representing one or more open, standardized protocols for luminaires, network controllers, input devices, bus power supplies, control gear, and other lighting industry devices. The DALI standardized protocols are published in multiple parts by, and DALI devices are certified by, the Digital Illumination Interface Alliance (DiiA). An international DALI standard is published in multiple parts by the International Electrotechnical Commission as IEC 62386.

DALI implements a dedicated protocol for a digital lighting control network that enables robust, scalable interoperability of lighting industry components from many manufacturers. A DALI network includes a single DALI network bus power supply, one or more application controllers, control and data input devices (e.g., programmed microcontrollers, industrial Internet of Things (IIoT) devices, sensors, keys, and the like), lighting control devices (e.g., electrical ballasts, LED drivers, dimmers, and other "control gear"), and a communication medium between the devices. Application controllers are arranged to configure, interrogate, and control slave (i.e., control gear) devices via bidirectional communication across a DALI interface by including a device identifier, or a plurality of device identifiers, in messages communicated across the network.

A DALI compatible network (i.e., a DALI network) is implemented via a two-wire interface. Power and data are carried by the same pair of wires. The polarity of the wires does not have to be observed. In a DALI network, each controlled device, and each controlling device, is assigned a unique short address in the base-10 numeric range 0 to 63. Hence, a DALI network can support up to 128 devices, wherein 64 of the devices may be DALI control devices, and 64 may be controlled devices (i.e., "control gear"). Individual addresses can be assigned to devices over the DALI network bus via a "commissioning" protocol, and information is communicated across the DALI network via an asynchronous, half-duplex, serial protocol operated at a fixed data transfer rate of 1200 bits per second (1200 bps). The low fixed bit rate of a DALI network allows a DALI network to be implemented in bus or star topologies and without a need for termination resistors.

The DALI network bus is a nominal 16 volt direct current (16 VDC) bus that communicates via Manchester coded data. At idle, the bus sits at 16 VDC. Communication begins with a start bit (i.e., a binary "1" asserted on the bus) followed by eight to thirty-two (8 to 32) data bits in most significant bit first (MSB-first) order. At a fixed data rate of 1200 bps, each data bit will be communicated over a period of about 833 microseconds (833 μsec).

According to Manchester coding, communicating a binary one ("1") data bit requires maintaining the bus high (i.e., "HI") for a first half of a data bit period (i.e., about 416 microseconds (μsec) and pulling the bus low (i.e., "LO") for a second half of the data bit period. Communicating a binary zero ("0") data bit is opposite—that is, the bus is pulled LO for a first 416 μsec and maintained HI for a second 416 μsec. To begin a data transmission, a binary "1" is asserted on the DALI network bus, and after each communication, the devices must allow at least 2.45 milliseconds (2.45 msec) of idle time on the bus.

Driving the DALI network bus HI requires maintaining 16 VDC on the bus plus or minus six and one-half volts (i.e., 16 VDC+/−6.5 VDC), and bringing the bus LO requires pulling the bus to 0 VDC+/−4.5 VDC.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure relate to smart control devices having active and embedded computing circuitry that supports a configurable, multi-sensor DALI network. The smart controllers may provide dimming control signals, DALI control signals, and a DALI-networked power supply.

According to one exemplary embodiment of the present disclosure, a control device includes a processor, a memory, a powerline interface, a DALI-compatible power supply, a first controller (e.g., a DALI-compatible controller), a second controller (e.g., a lighting controller), and configuration circuitry. The powerline interface has a set of primary contacts (Line, Load, and Neutral) and a set of secondary contacts. The set of secondary contacts includes a first pair of secondary contacts and a second pair of secondary contacts. The configuration circuitry is arranged to selectively couple (a) an output of the first controller to the first pair of secondary contacts (e.g., when there is no output from the second controller) or (b) an output of the second controller to the first pair of secondary contacts and an output (or outputs) of one or more of the first controller and the power supply to the second pair of secondary contacts.

According to an alternative exemplary embodiment of the present disclosure, the configuration circuitry is further configurable to couple the output of the first controller to the first pair of secondary contacts at a first time and to couple the output of the second controller to the first pair of secondary contacts and the output of the power supply to the second pair of secondary contacts at a second time, which is later than the first time. According to another alternative embodiment, the configuration circuitry includes at least three configurable switching circuits to perform the selective coupling of the outputs of the first and second controllers and the power supply to the set of secondary contacts.

According to a further exemplary embodiment of the present disclosure, a system includes at least one DALI-compatible sensor and a control device coupled to the DALI-compatible sensor(s) via a DALI network bus. The control device includes a processor, a memory, a powerline interface, a DALI-compatible power supply, a first controller (e.g., a DALI-compatible controller), a second controller (e.g., a lighting controller), and configuration circuitry. The powerline interface has a set of primary contacts (Line, Load, and Neutral) and a set of secondary contacts. The set of secondary contacts includes a first pair of secondary contacts and a second pair of secondary contacts. The configuration circuitry is arranged to selectively couple (a) an output of the first controller to the first pair of secondary contacts (e.g., when there is no output from the second controller) or (b) an output of the first controller and an output of the power supply to the second pair of secondary contacts (e.g., when there is expected to be output from the second controller).

According to an alternative exemplary embodiment, the system further includes a second control device coupled to the DALI network bus. The second control device includes a second DALI-compatible power supply and second configuration circuitry. According to this embodiment, the second configuration circuitry is configurable to couple the second power supply to the DALI network bus and de-couple the second power supply from the DALI network bus.

According to a further exemplary embodiment, the system further includes a streetlight pole and a plurality of DALI-compatible sensors. The streetlight pole is arranged to support the control device. The sensors are physically coupled to the streetlight pole and electrically coupled to the control device via the DALI network bus.

According to a further exemplary embodiment of the present disclosure, a method is disclosed for selectively coupling at least one of a DALI-compatible controller and a DALI-compatible power supply to a DALI network bus through a powerline interface of a control device, wherein the control device includes the DALI-compatible controller and a lighting controller. According to this embodiment, determinations are made as to whether the DALI-compatible controller is to be coupled to the DALI network bus and whether the lighting controller is to supply a lighting control signal to at least one light source. When the DALI-compatible controller is to be coupled to the DALI network bus and the lighting control signal is not to be supplied to the at least one light source, the DALI-compatible controller is coupled to the DALI network bus via a first pair of secondary contacts of the powerline interface, wherein the powerline interface includes a set of primary contacts and a set of secondary contacts, wherein the set of primary contacts is arranged to carry a Line voltage signal, a Load voltage signal, and a Neutral voltage signal, and wherein the set of secondary contacts includes the first pair of secondary contacts and a second pair of secondary contacts. When the DALI-compatible controller is to be coupled to the DALI network bus and the lighting control signal is to be supplied to the at least one light source, the DALI-compatible controller is coupled to the DALI network bus via the second pair of secondary contacts and the lighting control signal is coupled to the at least one light source via the first pair of secondary contacts.

According to another exemplary embodiment in which the control device further includes the DALI-compatible power supply, a determination is made as to whether the DALI-compatible power supply is to be coupled to the DALI network bus. When the DALI-compatible controller and the DALI-compatible power supply are to be coupled to the DALI network bus and the lighting control signal is not to be supplied to the at least one light source, coupling the DALI-compatible controller to the DALI network bus via one of the first pair of secondary contacts and the second pair of secondary contacts and coupling the DALI-compatible power supply to the DALI network bus via the other of the first pair of secondary contacts and the second pair of secondary contacts.

According to another exemplary embodiment in which the control device includes the DALI-compatible power supply, a determination is made as to whether the DALI-compatible power supply is to be coupled to the DALI network bus. In this case, when the DALI-compatible controller and the DALI-compatible power supply are to be coupled to the DALI network bus and the lighting control signal is to be supplied to the at least one light source, coupling the DALI-compatible controller and the DALI-compatible power supply to the DALI network bus via the second pair of secondary contacts and coupling the lighting control signal to the at least one light source via the first pair of secondary contacts.

According to yet another exemplary embodiment in which the control device includes the DALI-compatible power supply, a determination is made as to whether an external DALI-compatible power supply is coupled to the DALI network bus. When the external DALI-compatible power supply is determined not to be coupled to the DALI network bus, coupling the DALI-compatible power supply of the control device to the DALI network bus via the first pair of secondary contacts when the lighting control signal is not to be supplied to the at least one light source.

According to yet another exemplary embodiment in which the control device includes the DALI-compatible power supply, a determination is made as to whether an external DALI-compatible power supply is coupled to the DALI network bus. When the external DALI-compatible power supply is determined not to be coupled to the DALI network bus, coupling the DALI-compatible power supply of the control device to the DALI network bus via the second pair of secondary contacts when the lighting control signal is to be supplied to the at least one light source.

According to a further exemplary embodiment of the present disclosure, the DALI-compatible controller receives information from an external DALI-compliant device coupled to the DALI network bus. In this case, the control device wirelessly communicates at least some of the information received from the DALI-compliant device to a remote computing device.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
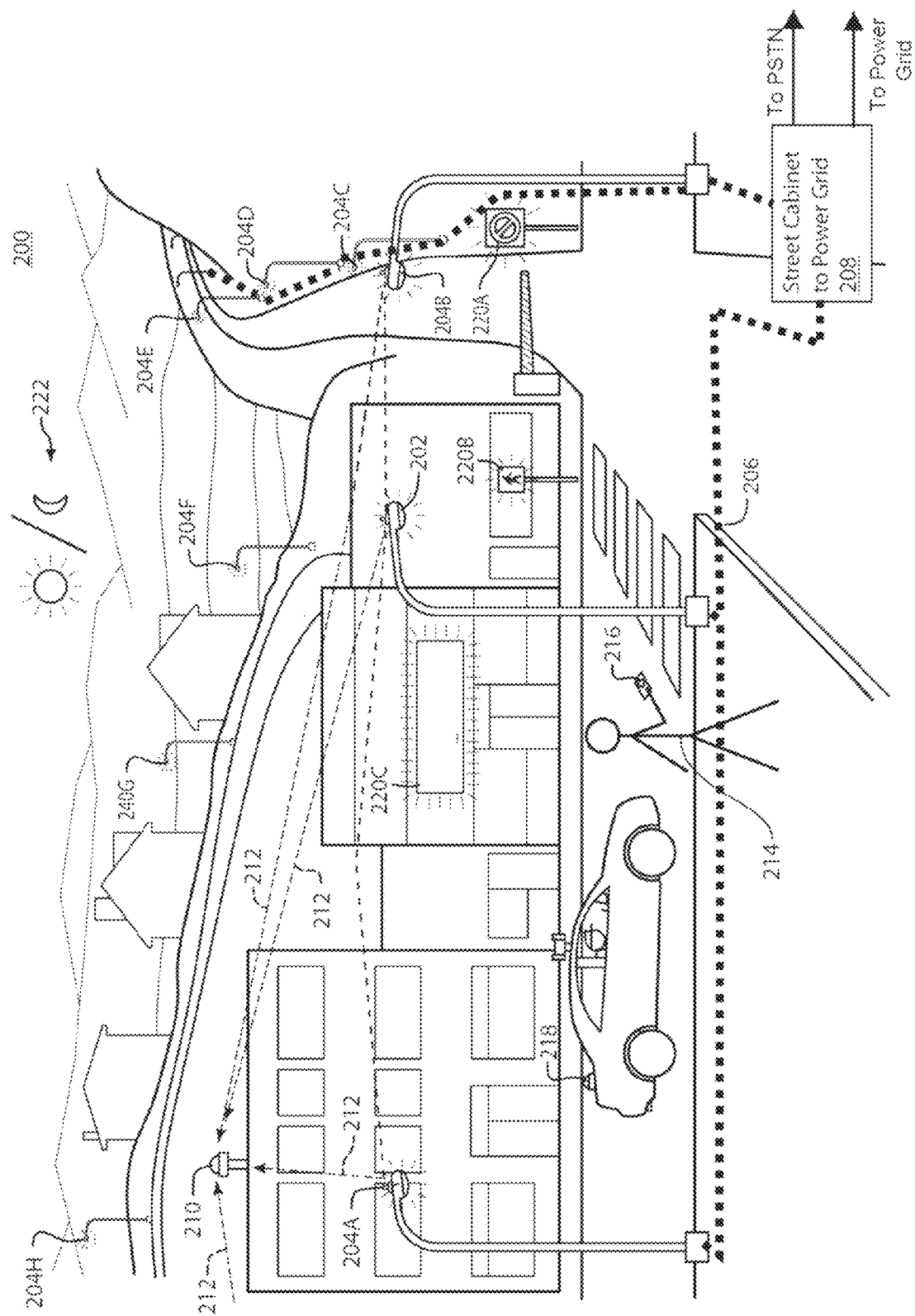
FIG. 1 is an exemplary system level deployment having a plurality of streetlight-based smart device embodiments.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also, in these instances, well-known structures may be omitted or shown and described in reduced detail to avoid unnecessarily obscuring descriptions of the embodiments.

The device, method, and system embodiments described in this disclosure relate to smart control devices having active and embedded computing circuitry that supports a configurable, multi-sensor Digital Addressable Lighting Interface (DALI) network.

According to one embodiment, the smart control device, or smart controller, is generally coupled to a streetlight luminaire via a powerline interface. One such powerline interface is a standardized powerline interface defining a limited number of electrical/communicative conduits over which signals may be passed into or out from the controller. In some cases, as will be discussed herein, the interface may be referred to as a NEMA interface, a NEMA socket, an ANSI C136 interface, or the like.

One known NEMA interface implements the powerline interface with connectors and receptacles that include seven electrical/communicative conduits (e.g., pins, blades, springs, connectors, receptacles, sockets, and other like "contacts"). A set of three primary contacts carry a Line voltage signal, a Load voltage signal, and Neutral voltage signal, respectively. A set of four secondary contacts may be used by the smart controller to pass power, control information, status information, and the like. The four secondary contacts may be treated as a first pair of secondary contacts and a second pair of secondary contacts.

In some cases, a first pair of secondary contacts may be used as a portion of a DALI network. In other cases where the smart controller is a streetlight controller, the first pair of secondary contacts may pass a pulse width modulation (PWM) duty cycle that directs the volume of light output from a luminaire associated with the streetlight controller. In these other cases where the first set of secondary contacts are used to pass PWM information, a second set of secondary contacts may be used as a portion of a DALI network. Embodiments of the present disclosure describe in detail the environment where such smart controllers operate, the structures of such smart controllers, and operating methods that implement such controllers.

FIG. 1 is an exemplary system level deployment 200 having at least one small cell networking device 202 and a plurality of smart sensor devices 204A-204H coupled to streetlight fixtures. The smart sensor devices 204A-204H are in many, but not all, cases implemented as smart streetlight controllers. Where the smart sensor devices implement smart streetlight controllers, the smart sensor devices include control mechanisms for lighting-based control networks, as described in more detail below.

As illustrated in FIG. 1, streetlight fixtures are coupled to or otherwise arranged as part of a system of streetlight poles, and each streetlight fixture includes a light source. Each light source, light fixture, and light fitting, individually or along with their related components, may in some cases be interchangeably referred to as a luminaire, a light source, a streetlight, a streetlamp, or some other such suitable term. In the system level deployment 200 illustrated in FIG. 1, at least one light pole includes a fixture with a small cell networking device 202, and a plurality of light poles each have a smart sensor device 204A-204H. In the present disclosure, light poles having a smart sensor device 204A-204H may individually or collectively be referred to as light poles having a smart sensor device 204 or simply light poles 204 for brevity. In these cases, and for the purposes of the present disclosure, the light sensor of each light pole 204 may be structurally and operatively identical (i.e., having the same or substantially similar circuitry and embedded software, and differing by way of one or more network-level system identifiers).

As shown in the system level deployment 200, a plurality of light poles 202, 204 are arranged in one or more determined geographic areas, and each light pole 202, 204 has at least one light source positioned in a fixture. The fixture is at least twenty feet above ground level and in at least some cases, the fixtures are between about 20 feet and 40 feet above ground level. In other cases, the streetlight fixtures may of course be lower than 20 feet above the ground or higher than 40 feet above the ground. In other system level deployments according to the present disclosure, there may be 1,000 or more light poles 202, 204 arranged in one or more determined geographic areas. In these or in still other cases, the streetlight fixtures may of course be lower than 20 feet above the ground or higher than 40 feet above the ground. Although described as being above the ground, streetlight fixtures shown and contemplated in the present disclosure may also be subterranean, but positioned above the floor, such as in a tunnel.

The system of streetlight poles, streetlight fixtures, streetlight sources, or the like in the system level deployment 200 may be controlled by a municipality or other government agency. In other cases, the system streetlight poles, streetlight fixtures, streetlight sources, or the like in the system level deployment 200 may be controlled by a private entity (e.g., private property owner, third-party service contractor, utility operator, or the like). In still other cases, a plurality of entities share control of the system of streetlight poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of streetlight poles, streetlight fixtures, streetlight sources, or the like can be granted some control such as in a neighborhood, around a hospital or fire department, in a construction area, or in some other manner.

In the system level deployment 200 of FIG. 1, any number of streetlight poles 202, 204 and their associated fixtures may be arranged with a connector that is compliant with a roadway area lighting standard promoted by a standards body such as ANSI C136.41 (e.g., a NEMA-based connector/socket system). The connector permits the controlling or servicing authority of the system to competitively and efficiently purchase and install light sensors on each streetlight fixture. In addition, or in the alternative, the standardized connector in each streetlight fixture permits the controlling or servicing authority to replace conventional light sensors with other devices such as a small cell networking device, a smart sensor device 120 (FIG. 3), or some other device.

In the system level deployment 200, a small cell networking device 202 is electromechanically coupled to a selected light pole, wherein the electromechanical coupling may be performed via a connector that is compliant with a roadway area lighting standard promoted by a standards body. Stated differently, the system level deployment 200 includes at least one light pole and fixture with a small cell networking device 202, and a plurality of light poles each having a smart sensor device 204A-204H. In these light poles 204, each streetlight fixture is equipped with a standalone smart device such as the smart sensor device 120 of FIGS. 2, 3, 4, and 5 that is electromechanically coupled to the luminaire via a respective connector, such as a connector that is compliant with a roadway area lighting standard promoted by a standards body. In this arrangement, each streetlight 202, 204 is equipped with a light sensor that is further electrically coupled to a processor-based light control circuit. In at least some of these embodiments, electrically coupling the light sensor to the processor-based light control circuit includes passing a signal representing an amount of light detected by the light sensor to the processor-based light control circuit. In at least some of these embodiments, the light sensor is arranged to detect an amount of lux, lumens, or other measurement of luminous flux and generate the signal representing the amount of light detected.

The processor-based light control circuit of each smart sensor device is arranged to provide a light control signal to the respective light source based on at least one ambient light signal generated by a light sensor associated with the processor-based light control circuit. In addition, because each streetlight 202, 204 is equipped with communication capabilities, each light source in each streetlight 202, 204 can be controlled remotely as an independent light source or in combination with other light sources. In at least some of these cases, each of the plurality of light poles and fixtures with a smart sensor device 204 is communicatively coupled to the light pole and fixture with a small cell networking device 202. The communicative relationship from each of the plurality of light poles and fixtures with a smart sensor device 204 to the light pole and fixture with a small cell networking device 202 may be a direct communication or an indirect communication. That is, in some cases, one of the plurality of light poles and fixtures with a smart sensor device 204 may communicate directly to the light pole and fixture with a small cell networking device 202 or the one of the plurality of light poles and fixtures with a smart sensor device 204 may communicate via one or more other ones of the plurality of light poles and fixtures with a smart sensor device 204 or via some other means (e.g., via a cellular communication to a traditional cellular macro-cell, via a wired connection, or the like).

In the system level deployment 200 of FIG. 1, various ones of the light poles may be 50 feet apart, 100 feet apart, 250 feet apart, or some other distance. In some cases, the type and performance characteristics of each small cell networking device and each smart sensor device 120 are selected based on their respective distance to other such devices such that wireless communications are acceptable.

The light pole and fixture with a small cell networking device 202 and each light pole and fixture with a smart sensor device 204 may be directly or indirectly coupled to a street cabinet 208 or other like structure that provides utility power (e.g., "the power grid") in a wired way. The utility power may provide 120 VAC, 208 VAC, 220 VAC, 240 VAC, 260 VAC, 277 VAC, 360 VAC, 415 VAC, 480 VAC, 600 VAC, or some other power source voltage. In addition, the light pole and fixture with a small cell networking device 202, and optionally one or more of the light poles and fixtures with smart sensor devices 204A-204H, are also coupled to the same street cabinet 208 or another structure via a wired backhaul connection. It is understood that these wired connections are in some cases separate wired connections (e.g., copper wire, fiber optic cable, industrial Ethernet cable, or the like) and in some cases combined wired connections (e.g., power over Ethernet (PoE), powerline communications (PLC), or the like). For simplification of the system level deployment 200 of FIG. 1, the wired backhaul and power line 206 is illustrated as a single line. In the embodiment of FIG. 1, the street cabinet 208 is coupled to the power grid, which is administered by a licensed power utility agency, and the street cabinet 208 is coupled to the public switched telephone network (PSTN). In other embodiments, the street cabinet 208 may be electrically, communicatively, or electrically and communicatively to some other infrastructure (e.g., power source, satellite communication network, or the like) such as a windmill, generator, solar source, fuel cell, satellite dish, long- or short-wave transceiver, or the like.

In some embodiments, any number of small cell networking devices 202 and smart sensor devices 204 are arranged to provide utility grade power metering functions. The utility grade power metering functions may be performed with a circuit arranged to apply any one or more of a full load, a partial load, and a load where voltage and current are out of phase (e.g., 60 degrees; 0.5 power factor). Other metering methodologies are also contemplated.

Each light pole and fixture with a smart sensor device 204 is in direct or indirect wireless communication with the light pole and fixture that has the small cell networking device 202. In addition, each light pole and fixture with a smart sensor device 204 and the light pole and fixture with the small cell networking device 202 may also be in direct or indirect wireless communication 212 with an optional remote computing device 210. The remote computing device 210, when it is included in the system level deployment 200, may be controlled by a mobile network operator (MNO), a municipality, another government agency, a utility, a third party, or some other entity. By this optional arrangement, the remote computing device 210 can be arranged to wirelessly communicate light control signals and any other information (e.g., packetized data) between itself and each respective wireless networking device coupled to any of the plurality of light poles.

A user 214 holding a mobile device 216 is represented in the system level deployment 200 of FIG. 1. A vehicle having an in-vehicle mobile device 218 is also represented. The vehicle may be an emergency service vehicle, a passenger vehicle, a commercial vehicle, a public transportation vehicle, a drone, or some other type of vehicle. The user 214 may use their mobile device 216 to establish a wireless communication session over a cellular-based network controlled by an MNO, wherein packetized wireless data is passed through the light pole and fixture with a small cell networking device 202. Concurrently, the in-vehicle mobile device 218 may also establish a wireless communication session over the same or a different cellular-based network controlled by the same or a different MNO, wherein packetized wireless data of the second session is also passed through the light pole and fixture with a small cell networking device 202.

Other devices may also communicate through light pole-based devices of the system level deployment 200. These devices may be internet of things (IoT) devices or some other types of devices. In FIG. 1, two public information signs 220A, 220B, and a private entity sign 220C are shown, but many other types of devices are contemplated. Each one of these devices may form an unlicensed wireless communication session (e.g., WiFi) or a cellular-based wireless communication session with one or more wireless networks made available by the devices shown in the system level deployment 200 of FIG. 1.

The sun and moon 222 are shown in FIG. 1. Light or the absence of light based on time of day, weather, geography, or other causes provide information (e.g., ambient light) to the light sensors of the light pole mounted devices described in the present disclosure. Based on this information, the associated light sources may be suitably controlled.

Figure 2:
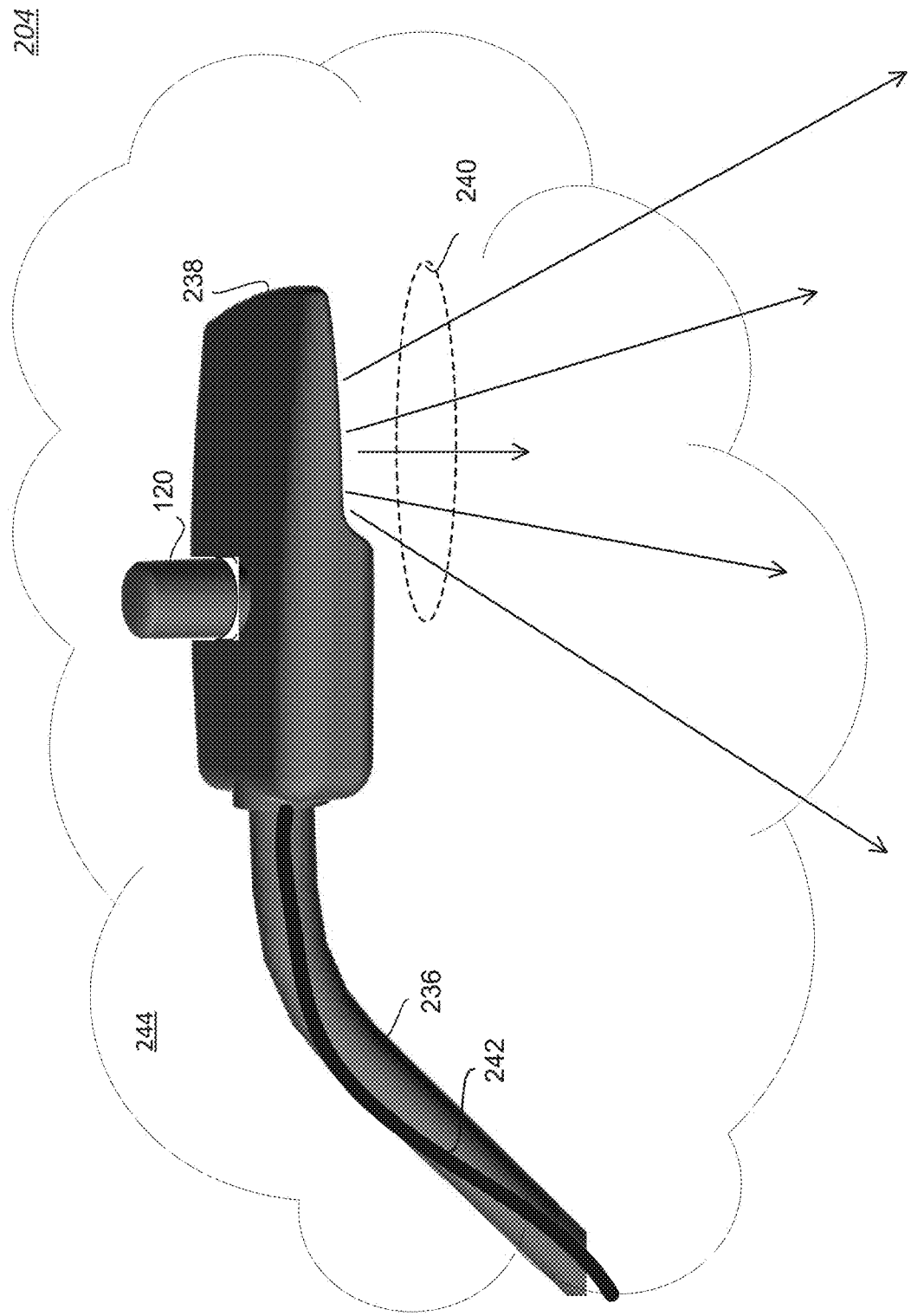
FIG. 2 is portion of a light pole and fixture with an exemplary smart sensor device.

FIG. 2 is portion of a streetlight pole and luminaire 238 fixture with a smart sensor device 204. A streetlight support structure 236 (e.g., a pole) supports the luminaire 238. The luminaire 238 has a top-side connector (e.g., a socket) that may be compliant with a roadway area lighting standard promoted by a standards body such as ANSI C136.41 (e.g., a NEMA-based connector/socket system). A smart sensor device 120 includes a corresponding connector (e.g., a set of "pins") at its base, which permits electro-mechanical coupling of the smart sensor device 120 to the luminaire 238.

The smart sensor device 120 in FIG. 2 has support circuitry including a power supply compatible with a Digital Addressable Lighting Interface (DALI) protocol (i.e., a DALI power supply), a controller compatible with a DALI interface (i.e., DALI controller), a controller arranged to direct a volume of light 240 output from a luminaire associated with the streetlight control device (e.g., a pulse width modulation (PWM) controller, a light emitting diode (LED) driver, dimming circuit, ballast, and the like), and certain switching and control circuits, all of which are further described in the present disclosure.

In some cases, the smart sensor device 120 is configured to send, receive, or send and receive information from one or more devices that comply with a DALI protocol (i.e., DALI compliant devices). The smart sensor devices communicate by passing commands and data through its connector and through the top-side connector of the luminaire. Inside the luminaire housing, a proximal end of a two-wire bus 242 (not shown in FIG. 2) is electrically coupled to the top-side connector, and distal end of the two-wire bus 242 (not shown in FIG. 2) is coupled to one or more DALI compliant devices. The two-wire bus 242 may be implemented as a DALI network bus cable, a jacketed wire having two or more separate and distinct electrical conduits, re-used mains wiring, or in some other configuration that is at least compatible with a selected DALI protocol.

DALI compliant devices may be control devices or controlled devices (e.g., DALI compatible control gear). A DALI network permits multiple control devices to cooperate on a DALI network bus. DALI controlled devices include air quality sensors, particulate sensors, toxin sensors, humidity sensors, temperature sensors, carbon monoxide sensors, carbon dioxide sensors, wind sensors, light sensors, LED drivers, light group controllers, and light-ballast devices. Other DALI control gear devices are also contemplated. Many of the DALI control gear devices coupled to DALI network bus are arranged to capture data regarding any type of condition to be sensed 244 in proximity of the streetlight or streetlight pole where the smart sensor device 120 is deployed.

Figure 3:
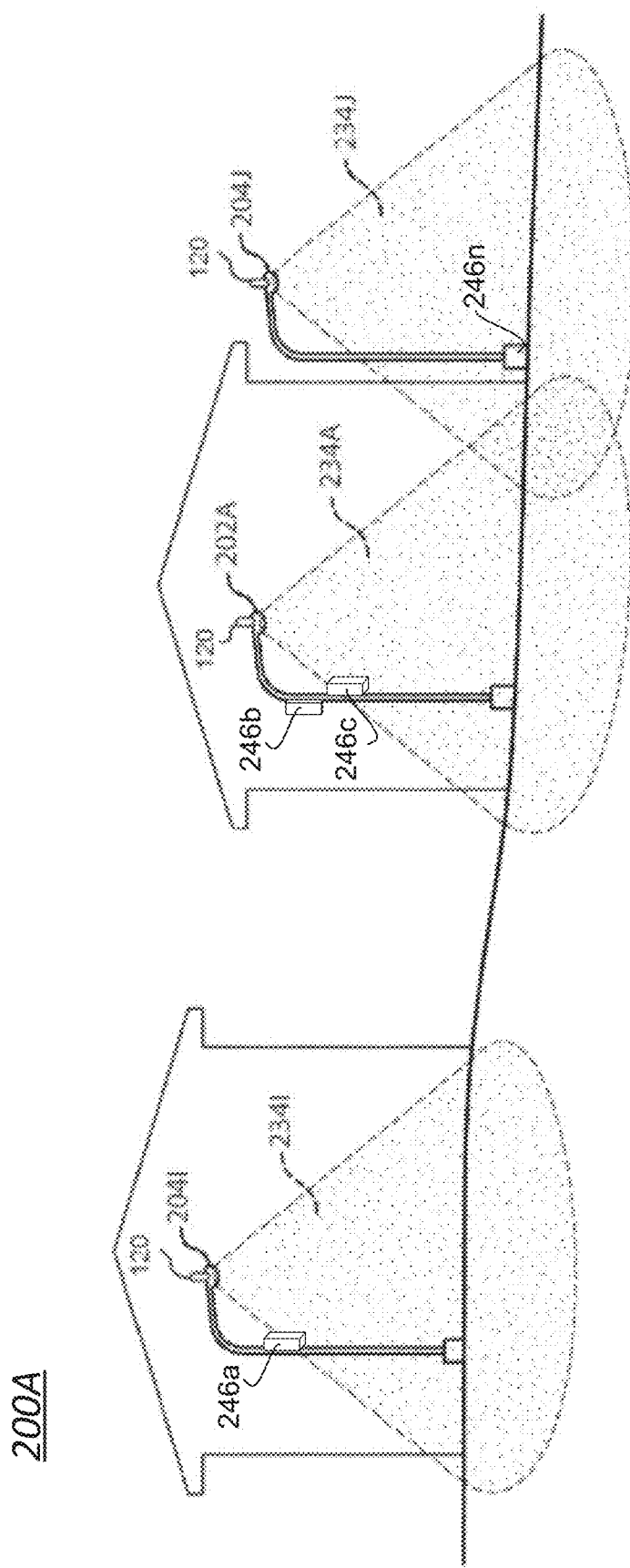
FIG. 3 is an exemplary partial system level deployments.

FIG. 3 is an exemplary partial system level deployment 200A. In the partial system level deployment 200A, a light pole and fixture with a small cell networking device 202A is shown and two light poles and fixtures with a smart sensor device 204I, 204J are shown. The individual small cell networking device 202A and smart sensor devices 120 are also identified. In some cases, a light sensor detects both ambient light from above its respective fixture and other light from different directions. For example, where light from two light sources overlap, one or both of the small cell networking device 202A and the smart sensor devices 120 may adjust their light output. The adjustment may be a reduction in light output, a directional change to light output, or some other adjustment. Along these lines, where light from two light sources do not overlap at all, there may be areas in need of additional illumination. In this case, one or both of the small cell networking device 202A and the smart sensor devices 120 may adjust their light output.

In some cases, the small cell networking device 202A and the smart sensor devices 120 are arranged with DALI compliant devices. In FIG. 3, the small cell networking device 202A is coupled to a first and second DALI compliant devices 246b, 246c via a DALI network bus cable, a first smart sensor device 120 is coupled to a third DALI compliant devices 246a via a DALI network bus cable, and a second smart sensor device 120 is coupled to an "$n^{th}$" DALI compliant device 246n via a DALI network bus cable. To avoid unnecessarily obfuscating FIG. 3, the DALI network bus cables are not shown. In the partial system level deployment 200A, a first DALI compliant device 246b may be arranged to dynamically detect motion (e.g., infrared detection sensor, mobile device transceiver detection, riot sensor, crowd sensor, pedestrian sensor, child sensor, disabled-person sensor, vehicle sensor, wildlife sensor, or the like), and a DALI controller in the small cell networking device 202A may be arranged to adjust light output to increase, decrease, or change other parameters such as a direction of light output when the motion is directionally detected or detected based on some other parameter. A second DALI compliant device 246c may be an air quality sensor, and a third DALI compliant device 246a may be a weather or other environmental condition sensor (e.g., wind sensor, humidity sensor, temperature sensor, vibration sensor, pressure sensor, or any one or more of the like). The "$n^{th}$" DALI compliant device 246n may be a water level sensor, freezing condition sensor, or the like. Many other DALI compliant device types, deployment locations, and deployment conditions are contemplated.

In some cases, each of the separate and distinct streetlight poles in the partial system level deployment 200A of FIG. 3 operates its own closed DALI network. In other cases, some or all of the separate and distinct streetlight poles in the partial system level deployment 200A implement a common DALI network with one or more DALI control devices and a plurality of DALI controlled (i.e., DALI control gear) devices. A DALI network may be configured as a daisy chain, a star topology, or a combination of daisy chain and star topologies. Additionally, a DALI network may operate with one, two, or more DALI control devices. One limitation of a DALI network, however, is that the network only permits a single DALI power supply. Accordingly, in cases along the lines of the partial system level deployment 200A where a plurality of separate and distinct streetlight poles are deployed, it would be technically beneficial to use a flexible system of DALI power supplies and DALI controllers that can be deployed either individually on separate DALI networks or cooperatively on larger DALI networks with many devices.

Figure 4B:
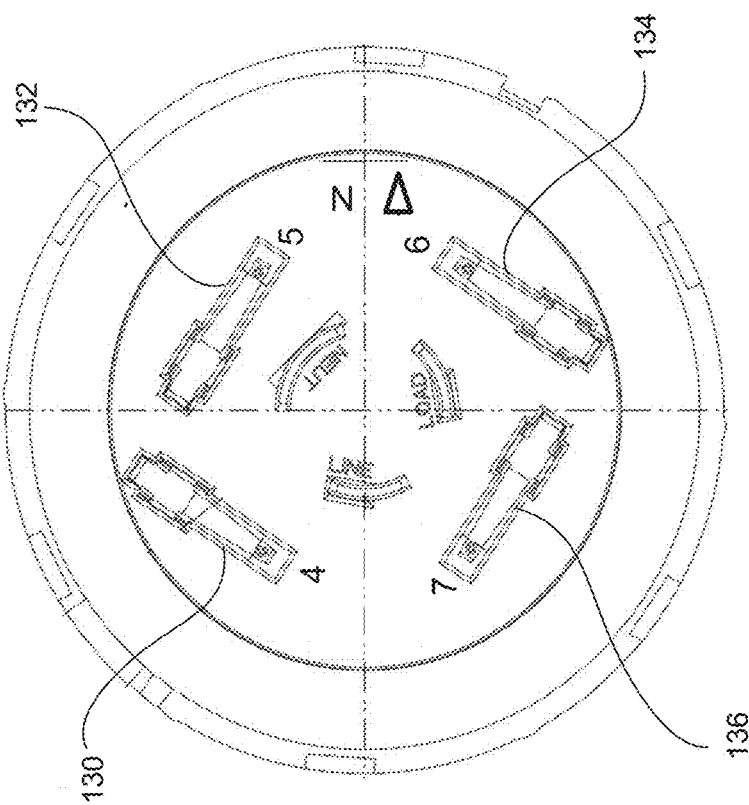
FIG. 4B is a bottom view of an embodiment of the base of the exemplary smart sensor device of FIG. 4A.
Figure 4A:
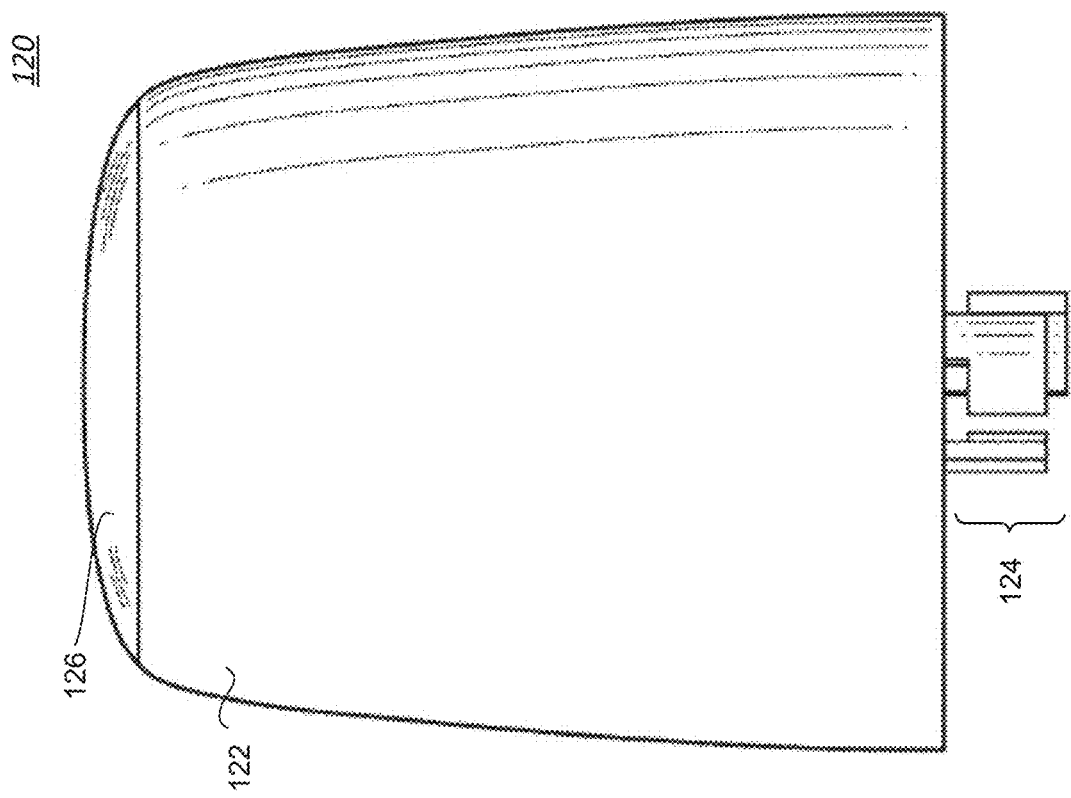
FIG. 4A is an exemplary smart sensor device embodiment.

FIG. 4A is an exemplary smart sensor device 120 embodiment. FIG. 4B is bottom view of an embodiment of the base 128 of the exemplary smart sensor device 120 of FIG. 4A. The arrangement of connectors 124 and contacts 130-136 that are accessible from the base 128 of the exemplary smart sensor device 120 as shown in FIGS. 4A and 4B conforms to a standardized powerline interface, such as the NEMA interface. In the present disclosure, FIGS. 4A-4B may be individually or collectively referred to as FIG. 4. Structures earlier identified are not repeated for brevity.

The smart sensor device 120 includes a housing 122, which may be generally cylindrical as illustrated in FIG. 4. The housing 122 may be formed of a plastic, a glass, a metal, a composite material, or any other suitable material. The housing 122 may in some cases have heat dissipation properties to assist in the removal of heat generated by electronic circuitry inside the housing. In at least some cases, the housing 122 is arranged to resist the nesting of birds or other animals. In at least some cases, the housing 122 is arranged to resist accumulation of dirt, snow, or any foreign bodies or materials. In at least some cases, the housing 122 is symmetrically arranged to have a generally same visual appearance when viewed from any perspective.

The housing 122 includes a connector 124 (e.g., a set of "pins") that may be compliant with a standardized powerline interface. In the embodiment of FIG. 4, the connector 124 is compliant with a powerline interface for roadway area lighting promoted by a standards body such as ANSI C136.41 (e.g., a NEMA-based connector/socket system), but other powerline interfaces are contemplated (e.g., an interface compliant with the ZHAGA CONSORTIUM, which is an international association that creates industry standards in the LED lighting industry). When the smart sensor device 120 is deployed, the pins of the connector 124 mate with a corresponding receptacle (e.g., a socket) that is integrated in a streetlight, a luminaire, a control box, or some other structure, which permits electro-mechanical coupling of the smart sensor device 120 to the streetlight, luminaire, control box, or the like.

The housing 122 of the smart sensor device 120 includes a light-transmissive surface 126. The light-transmissive surface may be transparent or partially transparent (e.g., partially opaque). In some embodiments, the light-transmissive surface 126 is integrated with the housing 122, and in other cases, the light-transmissive surface 126 is a distinct structure that is removably or fixedly coupled to the housing 122. In the embodiment of FIG. 4, the light-transmissive surface 126 is arranged at a "top" of the smart sensor device 120, but in at least some embodiments, the light-transmissive surface 126 is formed additionally or alternatively in or through a surface wall of the housing 122. Generally, the light-transmissive surface 126 permits ambient light to reach an electronic light sensor (e.g., a photosensor, which is not shown in FIG. 4) formed within a volumetric cavity inside the housing 122. According to one embodiment of the present disclosure, the light sensor is arranged, in at least some cases, to provide a first output signal that directs a light source to illuminate when light reaching the light sensor crosses a determined first threshold, and to provide a second signal (e.g., an alteration of the first signal or a different signal) when the light reaching the light sensor crosses a determined second threshold. In some cases, the first and second thresholds are the same thresholds, and in some cases, the first and second thresholds are different thresholds.

Turning to FIG. 4B, a bottom view of the base 128 of the smart sensor device 120 is presented. Seven contact surfaces are shown in a configuration that, in this particular embodiment, complies with a standardized powerline interface. A physical marking, "N" and a corresponding arrow may be physically labeled on the base to guide an installer as to the proper orientation of the base 128 when installed.

In the embodiment of FIG. 4, the standardized powerline interface has a set of primary contacts 124 arranged to carry a Line voltage signal, a Load voltage signal, and a Neutral voltage signal, each of which may be located about a central location in the base 128 (i.e., semi-circular contact structures (e.g., pins, blades, connectors, or the like) physically labeled "Line," "Load," and "Neut." on the connector represented in FIG. 4B). The primary contacts 124 are arranged to pass a plurality of power transmission signals, which may be high voltage alternating current signals (AC) of 220 VAC, 280 VAC, 480 VAC, or some other voltage.

The standardized powerline interface illustrated in FIG. 4B further has a set of secondary contacts, which includes a first pair of secondary contacts 130, 132 (e.g., two offset spring steel contacts physically labeled "4" and "5," respectively, on the connector represented in FIG. 4B) and a second pair of secondary contacts 134, 136 (e.g., two offset spring steel contacts physically labeled "6" and "7," respectively, on the connector represented in FIG. 4B). In cases where the standardized powerline interface conforms to a NEMA-based protocol such as ANSI C136.41, the first pair of secondary contacts 130, 132 and the second pair of secondary contacts 134, 136 may be referred to as NEMA pins 4/5 and NEMA pins 6/7, respectively. In some cases, the set of secondary contacts is arranged to carry a plurality of optional dimmer control signals. In cases where the set of secondary contacts pass dimmer control signals, it is recognized that four dimmer control signals permit two independent dimmer control channels. In some cases, a single dimmer control signal is used as a node for a reference plane (e.g., an earth/chassis ground), and three separate dimmer control signals are implemented or implementable. In other cases, at least some of the four secondary contacts are arranged to communicate encoded binary data, and in still other cases, the secondary contacts implement a particular communication protocol (e.g., USB, I2C, SPI, or the like).

In at least one embodiment, one or more of the secondary contacts is electrically coupled to a chassis ground (e.g., lamp ground, chassis ground, earth ground). In this way, a physical ground signal that is electrically coupled to a housing of a luminaire includes a stray voltage detection and processing module to detect stray voltage that may be dangerously present on the powerline interface. In at least some cases, a stray voltage is a voltage potential realized between the Neutral line voltage of the standard power transmission signals carried on the standardized powerline interface and the earth/chassis ground of the luminaire. It is recognized that such a potential may be caused by improper grounding, mis-wiring of equipment, equipment failure, failure in insulation around a hot power line conduit, capacitive coupling between energized lines and non-energized lines (e.g., un-connected adjacent wiring), an accident (e.g., a car accident that strikes a power pole and causes an energized powerline too short to the neutral line) or by some other circumstance. This condition, which presents a voltage potential on the chassis of the luminaire, may rise as high as the voltage potential between the Line signal or Load signal of the powerline interface and the Neutral line of the powerline interface. In at least some cases, the powerline interface may be passing signals as high as 480 VAC or higher, and if even a fraction of this voltage signal is present on the chassis of the luminaire or any other structures electrically coupled to the luminaire, then persons, property, and other living things may be at great risk of electric shock, electrocution, or fire.

Figure 5:
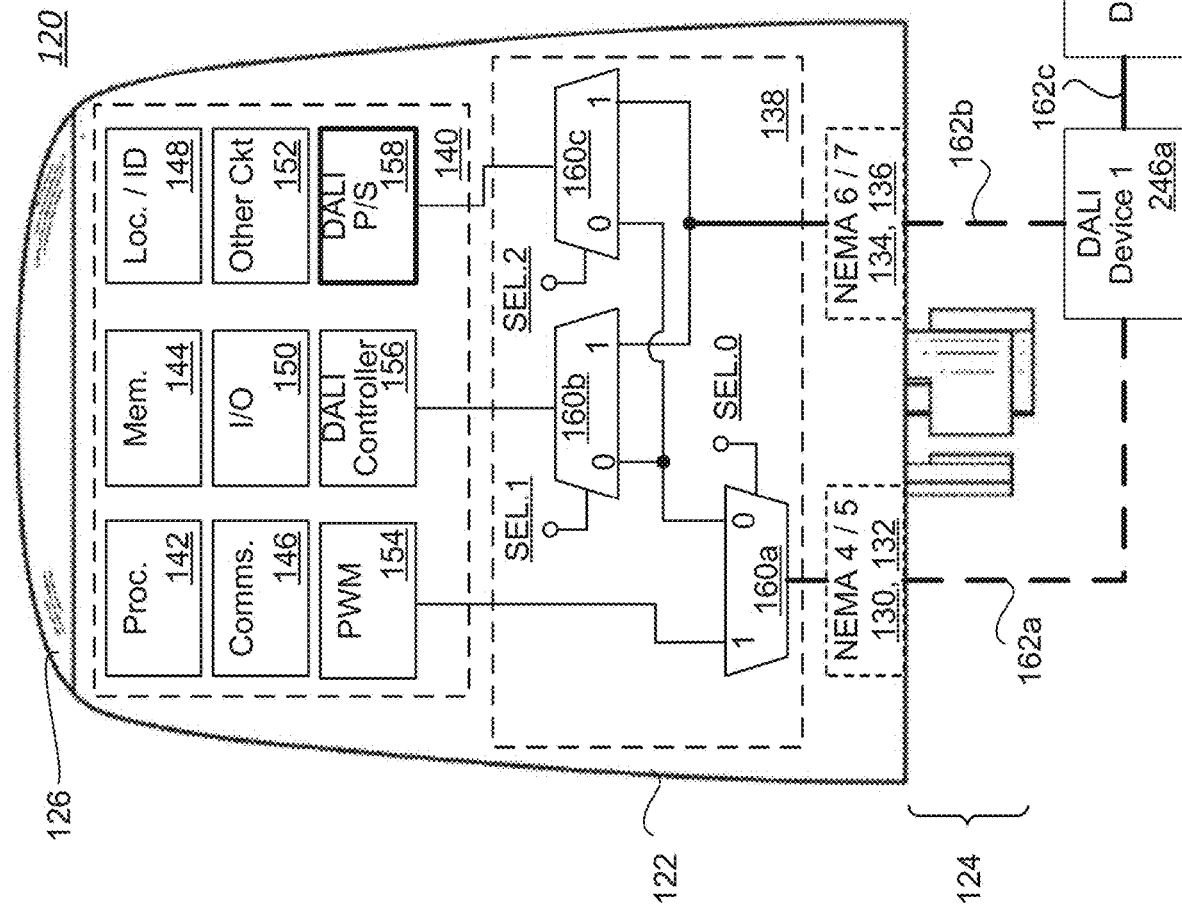
FIG. 5 illustrates operation of a smart sensor device in accordance with an exemplary embodiment of the present disclosure.

FIG. 5 illustrates operation of a smart sensor device 120 in accordance with an exemplary embodiment of the present disclosure. The exemplary smart sensor device 120 depicted in FIG. 5 includes a flexible DALI-based control structure. In some embodiments, the smart sensor device 120 of FIG. 5 is optionally coupled to one or more DALI compliant devices 246a, 246b, 246c, 246n (FIG. 3) via an optional DALI network bus 162a, 162b, 162c. One of skill in the art will recognize that the flexible DALI-based control structure of FIG. 5 may be deployed in a smart sensor device 120, a small cell networking device 202, or any other such device having a standardized powerline interface. The standardized powerline interface of FIG. 5 is a NEMA-based interface compliant with ANSI C136.41, but other standardized powerline interface protocols, connectors, receptacles, and configurations are contemplated.

Limited only by number of devices supportable in the DALI protocol, any suitable number of smart sensor devices 120 of FIG. 5 may be deployed in a full or partial system level deployment along the lines of FIGS. 1 and 3, where a plurality of separate and distinct streetlight poles are deployed. In these cases, a plurality of smart devices are deployed on one or more streetlights, and each smart device has a flexible system that includes a DALI power supply and a DALI controller along with zero or more DALI control gear devices coupled thereto. The smart devices are deployed either individually on separate DALI networks or cooperatively on larger DALI networks with many devices.

The smart devices contemplated in the present disclosure are discussed in reference to the smart sensor device 120 of FIG. 5, and it is understood by those of skill in the art that the teaching of the present disclosure can apply to many types of smart devices including small cells, smart hubs, smart streetlight controllers, smart monitor devices, and many others. The embodiment of FIG. 5 includes DALI configuration circuitry 138 and a microcontroller 140. The smart device 120 also includes a standardized powerline interface, which in the embodiment of FIG. 5 is along the lines of, but not limited to, the NEMA connector with a base 128 as illustrated in FIG. 4. Particularly, the first pair of secondary contacts 130, 132 and the second pair of secondary contacts 134, 136, respectively, and also identified as NEMA pins 4/5 and NEMA pins 6/7, are called out.

The microcontroller 140 may optionally include a processor 142, memory 144, a communications module 146, a location/identification module 148 (e.g., global positioning system (GPS), media access control (MAC) identifier or address, International Mobile Equipment Identity (IMEI) module, or some other unique location or identification structure), an input/output (I/O) module 150, and certain other circuits 152. Additionally, the microcontroller 140 may include a pulse width modulation (PWM) circuit 154, a DALI controller 156, and a DALI power supply 158. The microcontroller 140 is represented with a dashed line box to make clear that in some cases, the various circuits and modules are included in a single microcontroller package, and in other cases, any one or more of the modules 142-158 may be partially included in a microcontroller package and partially outside a microcontroller package, or any one or more of the modules 142-158 may be entirely outside of the microcontroller package. Additionally, any one or more of the modules 142-158 may be optionally included or excluded. The particular description herein with respect to the smart sensor device 120 of FIG. 5 does not divert from the teaching of the present disclosure, and any particular representation herein is not limiting unless expressly limited in the claims that follow.

In the embodiment of FIG. 5, the processor 142 is arranged to execute software instructions stored in the memory 144. The execution of such instructions may include retrieving particular data stored in the memory 144 and, in at least some cases, cooperation between the executing software instructions and the data stored in the memory causes the I/O module 150 to assert one or more of the selection signals SEL.0, SEL.1, SEL.2 of the DALI configuration circuitry 138. Accordingly, software executing in the microcontroller 140 may in some cases be used to set a particular configuration of use for NEMA pins 4/5 and NEMA pins 6/7 as indicated in Table. 1 herein. Additionally, in accordance with the present disclosure, the DALI configuration circuitry 138 may be flexibly configured in a first configuration at a first time and later re-configured in a second different configuration at a second time, which is later than the first time. In at least some cases, the DALI configuration circuitry 138 may be configured and re-configured any suitable number of times and at any suitable frequency of reconfiguration.

In some cases, further software instructions stored in the memory 144 are arranged to direct output of visual light from a corresponding luminaire, and in this way, the PWM circuit is configured to generate PWM information and pass the same via the first pair of contacts 130, 132 (i.e., NEMA pins 4/5) of the secondary connector to an LED driver in the luminaire. In some cases, software instructions are executed by the processor 142 to cause an interrogation of a selected DALI device, reading data from a selected DALI device, or passing commands to a selected DALI device to direct one or more operations of the selected DALI device. In these or still other cases, the communication module 146 may be arranged to communicate (i.e., transmit, receive, or transmit and receive) information such as DALI information to, from, or to and from a remote computing device via a wireless connection (e.g., a communication medium that conforms to a cellular or cellular-based protocol (e.g., 4G, LTE, 5G, or the like)) facilitated via communications module 146. The communicated information may direct a configuration of the secondary contacts of the standardized powerline interface or some other aspect of the DALI circuitry. Additionally, or alternatively, the communicated information may direct inclusion or exclusion of any DALI-compliant device, such as a DALI controller, a DALI control gear (e.g., a sensor), a DALI power supply, or the like.

The DALI configuration circuitry 138 includes a first switching circuit 160a, a second switching circuit 160b, and a third switching circuit 160c. Each of the plurality of switching circuits 160a, 160b, 160c is represented as a multiplexor or selector having a corresponding selection line, SEL.0, SEL.1, and SEL.2, respectively. The configuration table in FIG. 5, which corresponds to Table 1, identifies a plurality of configuration state embodiments implementable with the configuration circuitry 138. By applying particular signals on selection lines SEL.0, SEL.1, and SEL.2 of switching circuits 160a, 160b, 160c, respectively, the first pair of secondary contacts 130, 132 and the second pair of secondary contacts 134, 136, respectively, can be used to pass selected signals.

TABLE 1

Switching Circuit Configuration of NEMA pins 4-7

| SEL.0 | SEL.1 | SEL.2 | NEMA 4/5 | NEMA 6/7 |
| --- | --- | --- | --- | --- |
| 0 | 0 | 0 | DALI + p/s | Other |
| 0 | 0 | 1 | DALI only | DALI + p/s |
| 0 | 1 | 0 | p/s only | DALI only |
| 0 | 1 | 1 | other | DALI + p/s |
| 1 | 0 | 0 | PWM | other |
| 1 | 0 | 1 | PWM | p/s only |
| 1 | 1 | 0 | PWM | DALI only |
| 1 | 1 | 1 | PWM | DALI + p/s |

As further described herein, in some cases, NEMA pins 4/5 are used to pass dimming signals from a pulse width modulation (PWM) dimming circuit 154. This configuration is reached in FIG. 5 when selection line SEL.0 of the first selection circuitry 160a is asserted to a binary "1" (e.g., "HI") value. Alternatively, if selection line SEL.0 of first selection circuitry 160a is asserted to a binary "0" (e.g., "LO") value, then NEMA pins 4/5 may be arranged in a non-PWM way. More specifically, if selection line SEL.0 is asserted LO, then NEMA pins 4/5 may be arranged to carry: 1) DALI controller commands from DALI controller 156 along with DALI power signals from DALI power supply 158 (i.e., when SEL.1 and SEL.2 are both asserted LO); or 2) DALI controller commands from DALI controller 156 only (i.e., when SEL.1 is asserted LO and SEL.2 is asserted HI); or 3) DALI power signals from DALI power supply 158 only (i.e., when SEL.1 is asserted HI and SEL.2 is asserted LO); or 4) some other signal or configuration such as a stray voltage signal (e.g., when SEL.1 and SEL.2 are both asserted HI).

For completeness in the description of Table 1, if NEMA pins 4/5 are configured to carry dimming PWM signals from the PWM circuit 154 (i.e., selection line SEL.0 of first selection circuitry 160a is asserted HI), then NEMA pins 6/7 may be arranged to carry: 1) a non-DALI configuration (i.e., when SEL.1 and SEL.2 are both asserted LO); or 2) DALI controller commands from DALI controller 156 along with DALI power signals from DALI power supply 158 (i.e., when SEL.1 is asserted LO and SEL.2 is asserted HI); or 3) DALI controller commands from DALI controller 156 only (i.e., when SEL.1 is asserted HI and SEL.2 is asserted LO); or 4) DALI power signals from DALI power supply 158 only (i.e., when SEL.1 and SEL.2 are both asserted HI).

When DALI commands are carried out, and additionally or alternatively when a DALI power supply is coupled to a DALI network, the commands and power signals, as the case may be, are passed via a DALI network bus. As implemented in the embodiment of FIG. 5, one portion of DALI network bus 162a is optionally implemented through the first pair of secondary contacts 130, 132 (i.e., NEMA pins 4/5) based on the configuration of the DALI configuration circuitry 138. Correspondingly, another portion of DALI network bus 162b is optionally implemented through the second pair of secondary contacts 134, 136 (i.e., NEMA pins 6/7) based on the configuration of the DALI configuration circuitry 138. In this way, DALI power and DALI commands may be communicated to any one or more of DALI compliant devices 246a, 246b, 246c, 246n (FIG. 3). Furthermore, since any number of the smart devices discussed herein may be deployed on a plurality of streetlight poles, the plurality of devices may be individually configured to provide power from a single DALI power supply 158 to the DALI network bus 162a, 162b, 162c while disabling all other DALI power supplies 158 from other smart devices on the DALI network bus 162a, 162b, 162c. And additionally, any number of DALI controllers 156 from any number of smart sensors may be desirably included in the system level embodiment. For the avoidance of doubt, the DALI configuration circuitry 138 of FIG. 5, and the non-limiting configuration of Table 1 are representative of only some of the contemplated configurations. For example, in some cases, where desirable, the DALI configuration circuitry 138 may be arranged such that all of the first and second pairs of contacts of the set of secondary contacts of a standardized powerline interface are left for "other" purposes, and none of such contacts carry PWM signals, DALI command signals, DALI data signals, or DALI power.

Notwithstanding the discussion herein, one of skill in the art will recognize that the DALI configuration circuitry 138 may be implemented in a variety of ways without diverting from the teaching of the present disclosure. For example, in some cases, the configuration circuitry 138 may include any one or more of a dedicated microcontroller and associated firmware, relays, diodes, transistors, other semiconductors, state machines, headers, jumper wires, resistors, capacitors, solder pads, the addition or removal of particular circuits or components, and other like means. In at least some cases, one or more configurations represented in Table 1 is implemented on a per-device basis using dedicated static, switchless circuitry.

Figure 6:
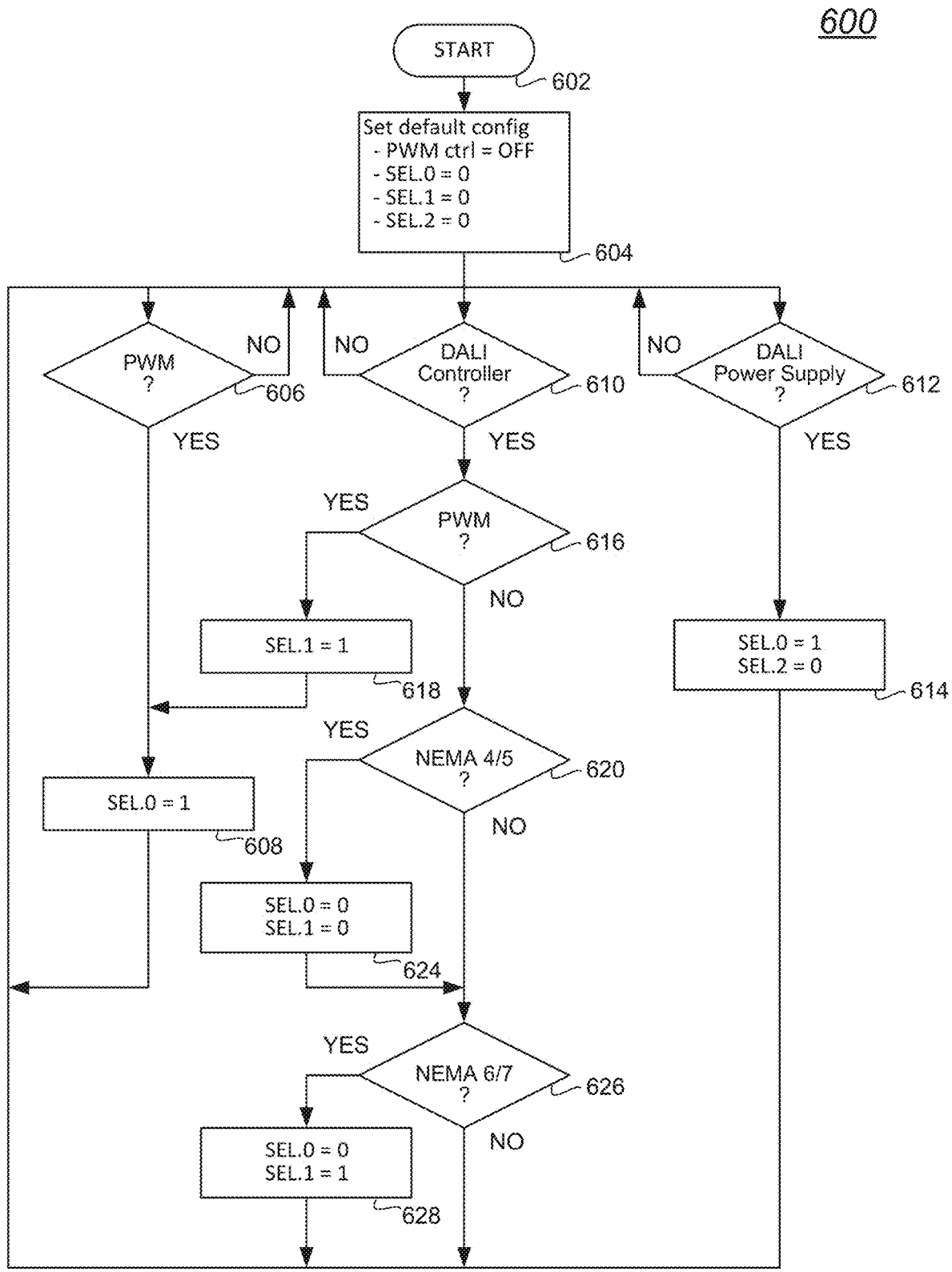
FIG. 6 is an exemplary data flow diagram representing processing associated with DALI configuration circuitry.

FIG. 6 is a data flow embodiment 600 representing processing associated with the DALI configuration circuitry 138. The processing of FIG. 6 is associated with a streetlight control device, such as smart sensor device 120 (FIG. 5), however, one of skill in the art will recognize the flexibility in the processing and circuitry of the present disclosure. The processing begins at block 602, where circuitry is powered on and booted up. After system boot, processing advances to block 604.

A default configuration is performed at block 604. Any suitable default configuration may be performed in other embodiments, but in the embodiment of FIG. 6, a lighting controller, such as pulse width modulation (PWM) circuit 154, is disabled and the selection lines (i.e., SEL.0, SEL.1, SEL.2) of electronic switching circuits 160a, 160b, 160c are returned to default states. When the PWM circuit 154 is disabled, no lighting control signal is generated, and in at least some cases, an LED driver and associated light source in a luminaire where the smart sensor device 120 is deployed will be extinguished. In other cases, such a luminaire may include a different lighting controller to drive a light source in another way, and no PWM circuit 154 will be operating if such a circuit is even present.

Also at block 604, it is recognized that the selection lines SEL.0, SEL.1, SEL.2 of first, second, and third electronic switching circuits 160a, 160b, 160c, respectively, control which signals, if any, are passed through a set of secondary contacts of the powerline interface (e.g., a first pair of secondary contacts 130, 132 and a second pair of secondary contacts 134, 136). In this exemplary, but not limiting, data flow embodiment, the first pair of secondary contacts 130, 132 are identified as NEMA pins 4 and 5, respectively, and the second pair of secondary contacts 134, 136 are identified as NEMA pins 6 and 7, respectively. By disabling PWM circuit 154 and setting SEL.0, SEL.1, and SEL.2 to binary "0" (e.g., "LO"), the smart sensor device 120 will let all four secondary contacts 130-136 electrically float.

After setting a default configuration at block 604, processing in the data flow embodiment 600 may arrange the first set of secondary contacts 130, 132 and the second set of secondary contacts 134, 136 in a desired configuration. Accordingly, processing at decision blocks 606, 610, and 612 may be performed serially (i.e., sequentially), concurrently, conditionally, or in some other way.

At decision block 606, an inquiry is made to determine if the first set of secondary contacts 130, 132 should be arranged to carry a lighting control signal (e.g., a PWM signal). Such an inquiry may include interrogating the memory 144, analyzing data from a light sensor (not shown), receiving a command or other directive from a remote computing source via the communications module 146, processing a celestial schedule or some other accessible database information to determine whether the light source should illuminate, executing an algorithm stored in the memory 144, or making some other inquiry. In the event a PWM inquiry indicates that PWM information will be output, processing continues at block 608.

At block 608, the first switching circuit 160a may be directed by asserting a binary "1" (e.g., "HI") on selection line SEL.0 of the first switching circuit 160a (e.g., a selector). In this way, the first pair of secondary contacts 130, 132 (e.g., NEMA pins 4/5) will be used to pass PWM data from the PWM circuit 154 of the smart sensor device 120, through the standardized powerline interface and into a luminaire on which the streetlight controller is electromechanically coupled.

After processing at block 608, processing continues to decision blocks 606, 610, and 612. At decision block 610, an inquiry is made to determine if a Digital Addressable Lighting Interface (DALI) controller, such as DALI controller 156, will be joined to a DALI network 162. The DALI controller 156 may be used in some cases to interrogate and receive information from zero or more DALI-compliant devices on the DALI network 162. In these and other cases, the DALI controller 156 may be used to pass command information to certain ones of the DALI compliant devices on the DALI network 162. In some cases, DALI information and commands are generated, collected, analyzed, or processed in some other way locally (e.g., programmatically) within the smart control device 120. Alternatively, or in addition, DALI information and commands are generated, collected, analyzed, or processed in some other way via a remote computer that is communicatively coupled to the smart control device 120. The communicative coupling, as described herein, may include passing packetized data to, from, or to and from a remote computing server 210 (FIG. 1) via a communications module 146 that is arranged for wireless communication via any suitable protocol as described herein. In at least one case, the communications module 146 wirelessly receives information directing a configuration of at least one of the first pair of secondary contacts 130, 132 and the second pair of secondary contacts 134, 136 of a standardized powerline interface.

If a DALI controller will not be included on a DALI network 162, processing continues to decision blocks 606, 610, and 612. If a DALI controller (e.g., DALI controller 156) is to be communicatively coupled to the DALI network bus 162, the processing continues at decision block 616.

At decision block 616, a same or new inquiry is made to determine whether the first pair of secondary contacts 130, 132 should be arranged to carry a PWM signal. If the first pair of secondary contacts 130, 132 will carry a PWM signal, then processing advances to blocks 618 and 608. Alternatively, processing advances to decision block 620.

In processing at blocks 618 and 608, respectively, selection line SEL.1 of the second switching circuit 160b is asserted HI (processing at block 618) and selection line SEL.0 of the first switching circuit 160a is asserted HI (processing at block 608). Processing then continues to decision blocks 606, 610, and 612.

At decision block 620, it is determined whether a DALI controller (e.g., DALI controller 156) is to be communicatively coupled to the DALI network bus 162, after it was determined that the first pair of secondary contacts 130, 132 will not be used for PWM. Accordingly, two consecutive inquiries are made at decision block 620 and decision block 626 to determine if one or the other of the first pair of secondary contacts 130, 132 and the second pair of secondary contacts 134, 136 will be used to carry DALI network bus signals.

A determination at decision block 620 whether the first pair of secondary contacts 130, 132 will be used to pass DALI signals may include an analysis of a parameter stored in memory 144, a command received from a remote computing server via communications module 146, a hard-wired signal, or some other mechanism. If affirmed, then processing advances to block 624, where selection line SEL.0 of the first switching circuit 160a is asserted LO and selection line SEL.1 of the second switching circuit 160b is asserted LO. After processing at blocks 620 and 624, processing advances to decision block 626.

A determination at decision block 626 whether the second pair of secondary contacts 134, 136 will be used to pass DALI signals may proceed along the lines of processing at decision block 620. That is, one or more parameters in memory 144 may be interrogated, one or more commands from a remote computing server may be received via communications module 146, signals may be hard-wired, or some other mechanism may be used. If affirmed, however, processing advances to block 628, and selection line SEL.0 of the first switching circuit 160*a* is asserted LO and selection line SEL.1 of the second switching circuit 160*b* is asserted HI. After processing at blocks 626 and 628, processing advances to decision blocks 606, 610, and 612.

At decision block 612, an analysis is made to determine whether a DALI power supply 158 should be coupled to DALI network 162. It is known that a DALI network permits only a single power supply. Accordingly, in a system where a plurality of smart control devices, such as smart sensor device 120 (e.g., a plurality of streetlight controllers), are deployed, one of the smart control devices 120 may have its DALI power supply 158 enabled, and all other devices that will share the DALI network 162 will have their power supplies 158 disabled or otherwise electrically de-coupled from the DALI network bus. In the embodiments of FIGS. 5 and 6, if a DALI power supply 158 is not to be included, processing advances to decision blocks 606, 610, and 612. Alternatively, if a DALI power supply 158 is to be included, processing continues at block 614.

At block 614, selection line SEL.0 of the first switching circuit 160*a* is asserted HI, and SEL.2 of the third switching circuit 160*c* is asserted LO.

Processing then returns to decision blocks 606, 610, and 612, and continues.

One of skill in the art will recognize that the data flow embodiment 600 of FIG. 6 does not teach every means of implementing DALI configuration circuitry 138, and the smart sensor device 120 embodiment of FIG. 5 does not teach every configuration possible for assigning signals and function to secondary pins of a standardized powerline interface. Instead, the circuitry of FIG. 5 and the data flow embodiment 600 of FIG. 6 teach a flexible arrangement of circuitry for organizing functions and deployment of a plurality of sensors, signals, DALI devices, and the like via a plurality of secondary contacts in a standardized powerline connector as heretofore has not been seen or known, and particularly absent in any type of streetlight-based control system.

Having now set forth certain embodiments, further clarification of certain terms used herein may be helpful to providing a more complete understanding of that which is considered inventive in the present disclosure.

Mobile network operators (MNOs) provide wireless cellular-based services in accordance with one or more cellular-based technologies. As used in the present disclosure, "cellular-based" should be interpreted in a broad sense to include any of the variety of technologies that implement wireless or mobile communications. Exemplary cellular-based systems include, but are not limited to, time division multiple access ("TDMA") systems, code division multiple access ("CDMA") systems, and Global System for Mobile communications ("GSM") systems. Some others of these technologies are conventionally referred to as UMTS, WCDMA, 4G, 5G, and LTE. Still other cellular-based technologies are also known now or will be known in the future. The underlying cellular-based technologies are mentioned here for a clearer understanding of the present disclosure, but the inventive aspects discussed herein are not limited to any particular cellular-based technology.

In some cases, cellular-based voice traffic is treated as digital data. In such cases, the term "voice-over-Internet-Protocol", or "VoIP," may be used to mean any type of voice service that is provided over a data network, such as an Internet Protocol (IP) based network. The term VoIP is interpreted broadly to include any system wherein a voice signal from a mobile computing device is represented as a digital signal that travels over a data network. VoIP then may also include any system wherein a digital signal from a data network is delivered to a mobile computing device where it is later delivered as an audio signal.

Standardized powerline interface connector devices of the types described herein are in at least some cases referred to as NEMA devices, NEMA compatible devices, NEMA compliant devices, or the like. And these devices include receptacles, connectors, sockets, holders, components, etc. Hence, as used in the present disclosure and elsewhere, those of skill in the art will recognize that coupling the term "NEMA" or the term "ANSI" with any such device indicates a device or structure compliant with a standard promoted by a standards body such as NEMA, ANSI, IEEE, or the like.

A mobile device, or mobile computing device, as the terms are used interchangeably herein, is an electronic device provisioned by at least one mobile network operator (MNO) to communicate data through the MNO's cellular-based network. The data may be voice data, short message service (SMS) data, electronic mail, world-wide web or other information conventionally referred to as "internet traffic," or any other type of electromagnetically communicable information. The data may be digital data or analog data. The data may be packetized or non-packetized. The data may be formed or passed at a particular priority level, or the data may have no assigned priority level at all. A non-comprehensive, non-limiting list of mobile devices is provided to aid in understanding the bounds of the term, "mobile device," as used herein. Mobile devices (i.e., mobile computing devices) include cell phones, smart phones, flip phone, tablets, phablets, handheld computers, laptop computers, body-worn computers, and the like. Certain other electronic equipment in any form factor may also be referred to as a mobile device when this equipment is provisioned for cellular-based communication on an MNO's cellular-based network. Examples of this other electronic equipment include in-vehicle devices, medical devices, industrial equipment, retail sales equipment, wholesale sales equipment, utility monitoring equipment, and other such equipment used by private, public, government, and other entities.

Mobile devices further have a collection of input/output ports for passing data over short distances to and from the mobile device. For example, serial ports, USB ports, WiFi ports, Bluetooth ports, IEEE 1394 FireWire, and the like can communicatively couple the mobile device to other computing apparatuses.

Mobile devices have a battery or other power source, and they may or may not have a display. In many mobile devices, a signal strength indicator is prominently positioned on the display to provide network communication connectivity information to the mobile device user.

A cellular transceiver is used to couple the mobile device to other communication devices through the cellular-based communication network. In some cases, software and data in a file system are communicated between the mobile device and a computing server via the cellular transceiver. That is, bidirectional communication between a mobile device and a computing server is facilitated by the cellular transceiver. For example, a computing server may download a new or updated version of software to the mobile device over the cellular-based communication network. As another example, the mobile device may communicate any other data to the computing server over the cellular-based communication network.

Each mobile device client has electronic memory accessible by at least one processing unit within the device. The memory is programmed with software that directs the one or more processing units. Some of the software modules in the memory control the operation of the mobile device with respect to generation, collection, and distribution or other use of data. In some cases, software directs the collection of individual datums, and in other cases, software directs the collection of sets of data.

Software may include a fully executable software program, a simple configuration data file, a link to additional directions, or any combination of known software types. When the computing server updates software, the update may be small or large. For example, in some cases, a computing server downloads a small configuration data file to as part of software, and in other cases, computing server completely replaces all of the present software on the mobile device with a fresh version. In some cases, software, data, or software and data is encrypted, encoded, and/or otherwise compressed for reasons that include security, privacy, data transfer speed, data cost, or the like.

Processing devices, or "processors," as described herein, include central processing units (CPU's), microprocessors, microcontrollers (MCU), digital signal processors (DSP), application specific integrated circuits (ASIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. A processor may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

As known by one skilled in the art, a computing device, including a mobile computing device, has one or more memories, and each memory may comprise any combination of volatile and non-volatile computer-readable media for reading and writing. Volatile computer-readable media includes, for example, random access memory (RAM). Non-volatile computer-readable media includes, for example, any one or more of read only memory (ROM), magnetic media such as a hard-disk, an optical disk, a flash memory device, a CD-ROM, and the like. In some cases, a particular memory is separated virtually or physically into separate areas, such as a first memory, a second memory, a third memory, etc. In these cases, it is understood that the different divisions of memory may be in different devices or embodied in a single memory. Some or all of the stored contents of a memory may include software instructions executable by a processing device to carry out one or more particular acts.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively, or in addition, each file may include data or other computational support material useful to carry out the computing functions of the systems, methods, and apparatus described in the present disclosure.

FIG. 6 is a data flow diagram (e.g., a flowchart) 600 illustrating processes that may be used by embodiments of computing devices such as the processor-based smart sensor device 120 of FIG. 5 and other such devices disclosed herein. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., recording and reporting the collection of utility grade power metering data, recording and reporting IoT data, crowd control data, anomalous action data, and the like). An example of an activity that is not real-time is one that occurs over an extended period of time (e.g., hours or days)] or that occurs based on intervention or direction by a person or other activity.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a small cell networking device may be described as being mounted "substantially horizontal," In these cases, a device that is mounted exactly horizontal is mounted along an "X" axis and a "Y" axis that is normal (i.e., 90 degrees or at right angle) to a plane or line formed by a "Z" axis. Different from the exact precision of the term, "horizontal," and the use of "substantially" or "about" to modify the characteristic permits a variance of the particular characteristic by up to 30 percent. As another example, a small cell networking device having a particular linear dimension of between about six (6) inches and twelve (12) inches includes such devices in which the linear dimension varies by up to 30 percent. Accordingly, the particular linear dimension of the small cell networking device may be between 2.4 inches and 15.6 inches.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As described herein, for simplicity, a user is in some case described in the context of the male gender. For example, the terms "his," "him," and the like may be used. It is understood that a user can be of any gender, and the terms "he," "his," and the like as used herein are to be interpreted broadly inclusive of all known gender definitions.

As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The use of the phrase "set" (e.g., "a set of items") or "subset," unless otherwise noted or contradicted by context, is to be construed as a nonempty collection comprising one or more members.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Various devices that utilize the circuits and modules of the present disclosure are described in U.S. Patent Application Publication No. US 2020/0383173 A1, which is incorporated herein by reference in its entirety to the fullest extent allowed by law.

Various devices that utilize the circuits and modules of the present disclosure are described in International Publication No. WO 2019/136480 A2, which is incorporated by reference in its entirety to the fullest extent allowed by law.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A control device comprising:
   a processor;
   a memory arranged to provide executable software instructions to the processor, the executable software instructions arranged to direct operations of the control device;
   a powerline interface having a set of primary contacts and a set of secondary contacts, the set of primary contacts being arranged to carry a Line voltage signal, a Load voltage signal, and a Neutral voltage signal, the set of secondary contacts including a first pair of secondary contacts and a second pair of secondary contacts;
   a power supply compatible with a Digital Addressable Lighting Interface (DALI) protocol;
   a first controller compatible with the DALI protocol;
   a second controller that is incompatible with the DALI protocol and operable to produce a light control signal; and
   configuration circuitry configurable to:
      couple an output of the first controller to the first pair of secondary contacts at a first time;
      couple an output of the second controller to the first pair of secondary contacts and an output of the power supply to the second pair of secondary contacts at a second time; and
      de-couple the output of the power supply from the second pair of secondary contacts.

2. The control device of claim 1, wherein the light control signal is arranged to direct a volume of light output from a luminaire associated with the control device.

3. The control device of claim 2, wherein the second controller is a pulse width modulation (PWM) controller arranged to output a PWM signal for the luminaire.

4. The control device of claim 1, wherein the powerline interface conforms to a standard provided by the National Electrical Manufacturers Association (NEMA).

5. The control device of claim 4, wherein the first pair of secondary contacts corresponds to fourth and fifth NEMA pins and wherein the second pair of secondary contacts corresponds to sixth and seventh NEMA pins.

6. The control device of claim 1, wherein the second time is later than the first time.

7. The control device of claim 1, wherein the configuration circuitry includes at least three configurable switching circuits.

8. The control device of claim 7, wherein the configuration circuitry is programmatically configurable.

9. The control device of claim 1, wherein the configuration circuitry is entirely hardware-based circuitry.

10. A system comprising:
at least one sensor having an interface that conforms to a Digital Addressable Lighting Interface (DALI) protocol; and
a control device coupled to the at least one sensor via a DALI network bus, wherein the control device includes:
a processor;
a memory arranged to provide executable software instructions to the processor, the executable software instructions arranged to direct operations of the control device;
a powerline interface having a set of primary contacts and a set of secondary contacts, the set of primary contacts being arranged to carry a Line voltage signal, a Load voltage signal, and a Neutral voltage signal, the set of secondary contacts including a first pair of secondary contacts and a second pair of secondary contacts;
a power supply compatible with the DALI protocol;
a first controller compatible with the DALI protocol;
a second controller that is incompatible with the DALI protocol and operable to produce a light control signal; and
configuration circuitry configurable to:
couple an output of the first controller to the first pair of secondary contacts at a first time;
couple an output of the second controller to the first pair of secondary contacts and an output of the power supply to the second pair of secondary contacts at a second time; and
de-couple the output of the power supply from the second pair of secondary contacts.

11. The system of claim 10, wherein the control device is further operable to determine if a second DALI power supply is already coupled to the DALI network bus.

12. The system of claim 10, further comprising:
a second control device coupled to the DALI network bus, wherein the second control device includes:
a second power supply compatible with the DALI protocol; and
second configuration circuitry configurable to:
couple the second power supply to the DALI network bus; and
de-couple the second power supply from the DALI network bus.

13. The system of claim 10, further comprising:
a streetlight pole arranged to support the control device; and
a plurality of sensors physically coupled to the streetlight pole and electrically coupled to the control device via the DALI network bus, each of the plurality of sensors having an interface that conforms to the DALI protocol.

14. The system of claim 10, wherein the light control signal is arranged to direct a volume of light output from a luminaire associated with the control device.

15. The system of claim 14, wherein the second controller is a pulse width modulation (PWM) controller arranged to output a PWM signal for the luminaire.

16. The system of claim 10, wherein the powerline interface conforms to a standard provided by the National Electrical Manufacturers Association (NEMA).

17. The system of claim 16, wherein the first pair of secondary contacts corresponds to fourth and fifth NEMA pins and wherein the second pair of secondary contacts corresponds to sixth and seventh NEMA pins.

18. The system of claim 10, wherein the second time is later than the first time.

19. The system of claim 10, wherein the configuration circuitry includes at least three configurable switching circuits.

20. The system of claim 10, wherein the configuration circuitry is entirely hardware-based circuitry.

* * * * *